May 15, 1956  J. PERRELLI ET AL  2,745,453
FREESTONE PITTER
Filed March 8, 1952  2 Sheets-Sheet 2
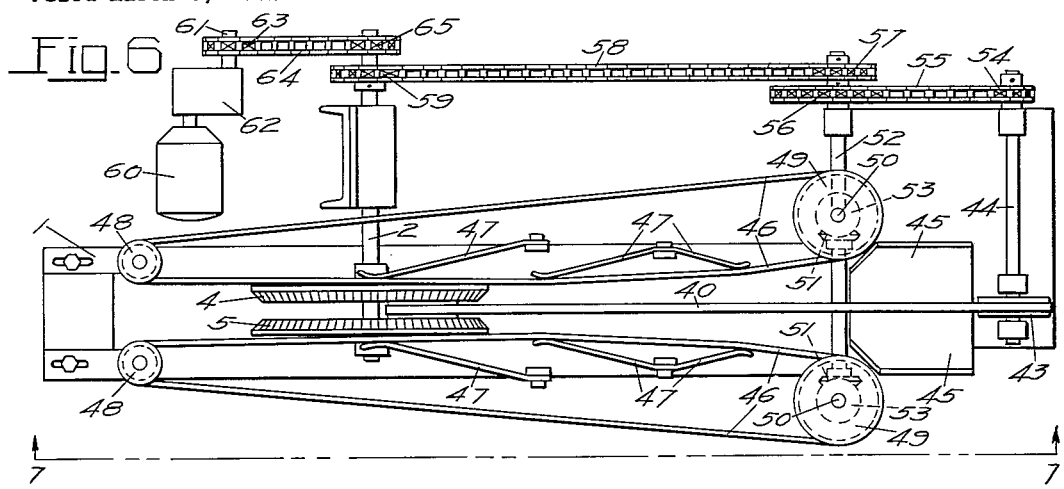
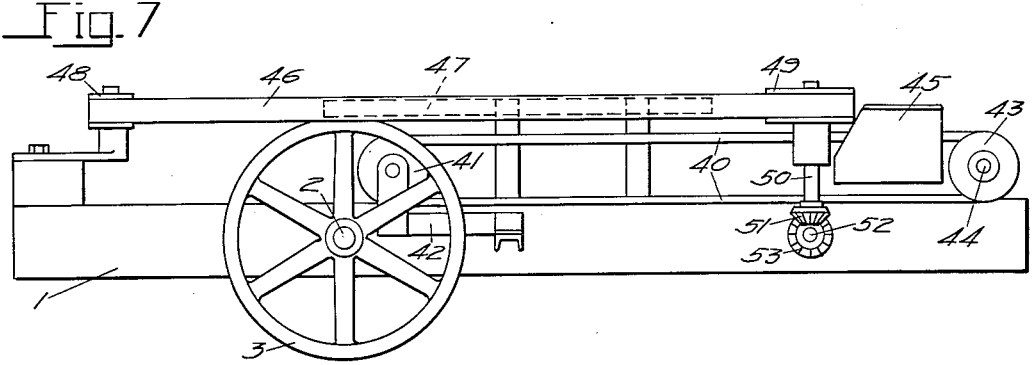
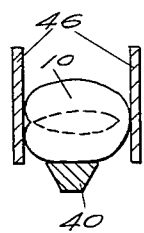
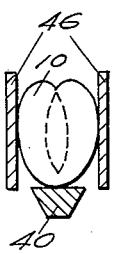
INVENTORS
JOSEPH PERRELLI
BY JOHN PERRELLI
Boyken, Mohler & Beckley
ATTORNEYS

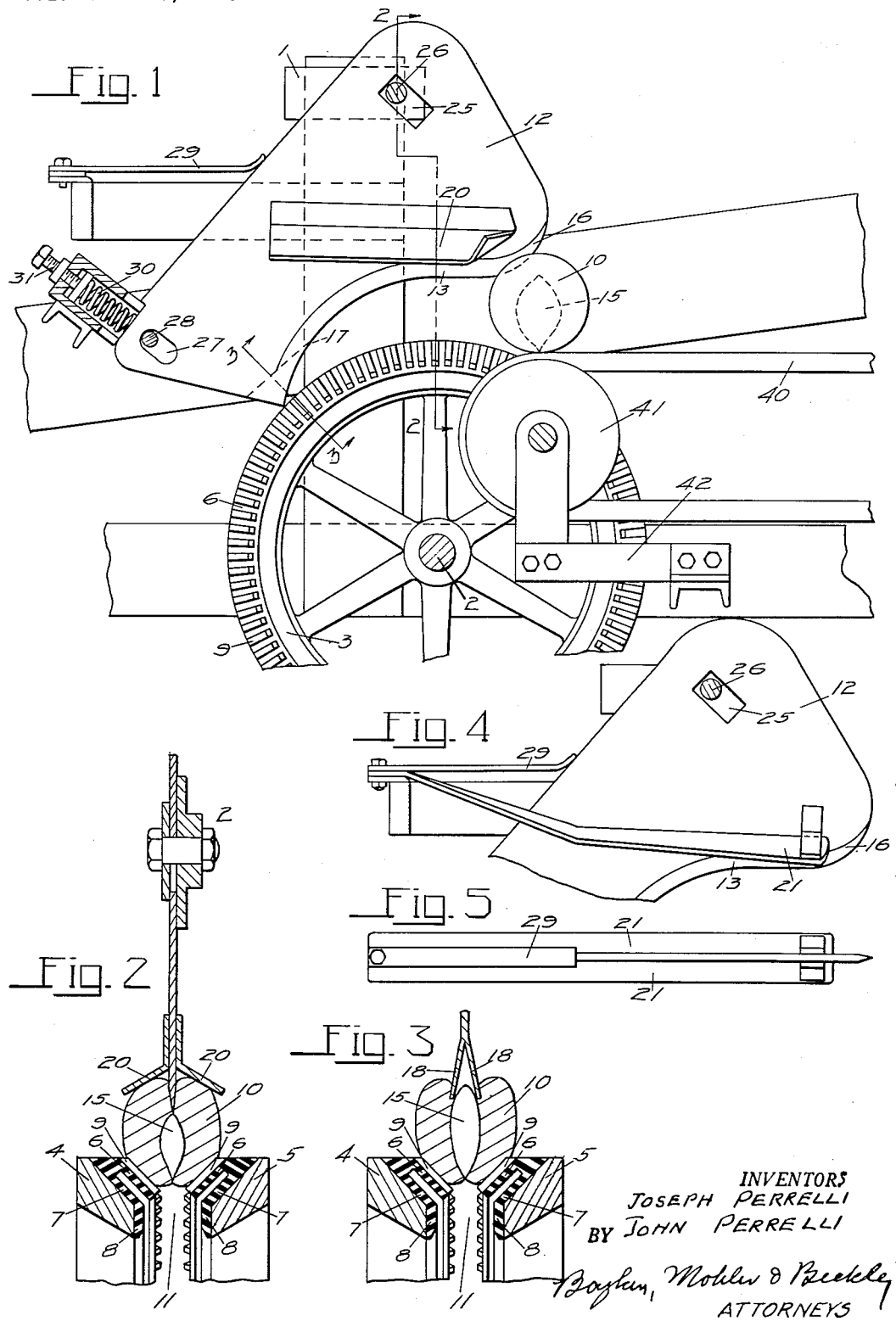

United States Patent Office 2,745,453
Patented May 15, 1956

2,745,453

FREESTONE PITTER

Joseph Perrelli and John Perrelli, Richmond, Calif.

Application March 8, 1952, Serial No. 275,586

7 Claims. (Cl. 146—28)

This invention relates to a pitter for drupes and is of the same general type as the pitter disclosed in United States Letters Patent No. 2,474,492 of Joseph and John Perrelli, and copending application for United States Letters Patent, Serial No. 167,848 filed June 13, 1950, now Patent No. 2,701,594, by John Perrelli.

One of the objects of the present invention is the provision of an improved structure for accomplishing the bisecting and pitting of freestone drupes, such as apricots, whereby a better pitting operation is made possible under wider variations of the fruit and pits as to size.

Another object of the invention is the provision of an upward feed device in combination with the pitting mechanism whereby the fruit may be fed more rapidly to said mechanism with less attention from the operator, and will be correctly positioned for pitting.

A still further object of the invention is the provision of a yieldable and moistureproof support for the flesh of the fruit that is being pitted during the bisecting of the flesh and during the pitting operation.

An additional object is the provision of means associated with the bisecting cutting blade for engaging the pit, whether split or solid, after the flesh of the drupe has been bisected for insuring a separation of the pit from the halves and a still further object of the invention is the provision of means associated with the flesh bisecting blade for holding the drupe in proper position during the bisecting step for cutting the flesh to the pit whether or not the pit itself engages the cutting edge of the bisecting blade.

In pitters of the type herein described and as described in said patent and in said application, the drupe, such as an apricot, is rolled along a path of travel and at the same time it is carved along a cutting blade the edge of which engages the pit so as to bisect the flesh of the apricot about the pit, thereby freeing the latter for removal from the flesh, and also at the same time the cutting edge of the blade and the support for the apricot or other freestone drupe, are so arranged that the blade forces the pit out of the bisected flesh so that the pit will not stick to either half after the drupe is bisected. However, due to certain irregularities in the contours of the pits and their sizes it has been found that at times a greater resistance than is desired may be created between the pit and the edge of the cutting blade. This resistance may occur at any point along the cutting edge, and one or more pits may produce such resistance at the same time and to the same or to different degrees. By the present invention the blade is so arranged and supported that it is movable in a manner to compensate for any character of such resistance as can possibly occur.

Also, heretofore, there have been occasions where either the pit is not properly centered relative to the cutting edge of the flesh bisecting blade, or the pit may be split or cracked, with the result that the pit is not properly removed from the fruit.

With the present invention, in the event the edge of the pit should not be exactly in the proper position below the blade, the fruit will be bisected properly and at the end of the blade, where the pit must be engaged by the blade to force it out of the fruit, the edge of the blade is directed so as to insure engagement with the pit, whether it is split cracked or is offset slightly to one side of the blade, and the pit will be properly forced out of the drupe.

Other objects and advantages will appear in the description and in the drawings.

In the drawings Fig. 1 is vertical sectional view of the main portion of the invention showing the several parts of the present invention most clearly.

Fig. 2 is an enlarged fragmentary sectional view taken along line 2—2 of Fig. 1.

Fig. 3 is an enlarged fragmentary sectional view taken along line 3—3 of Fig. 1.

Fig. 4 is a fragmentary side elevational view of a portion of the invention in slightly modified form.

Fig. 5 is a top plan view of the part shown in Fig. 4.

Fig. 6. is a part sectional and part plan view of the feed device, the pitter blade and its support being omitted.

Fig. 7 is an elevational view taken along line 7—7 of Fig. 6.

Figs. 8 and 9 are enlarged sectional views along the feed device schematically illustrating the positioning action of said feed device in positioning the drupes with their minor axes horizontal and so that the sutures of said drupes will be in the same plane as that of the cutting blade.

In detail, the frame of the pitting machine, designated 1 (Fig. 1) may be the same as the frame shown in said copending application, and wherever the numeral 1 appears in the drawings it designates a stationary part of the machine.

A horizontal shaft 2 is journalled on frame 1 for rotation thereof and said shaft has a pair of wheels 3 (Figs. 2, 3) secured thereto for rotation therewith. These wheels have rims 4, 5 that constitute the supports for each of the drupes as it is being pitted. It is immaterial whether the hub portions of the wheels are integral or separate from each other. The main requirement is that their rims be of the same diameter and spaced apart so that a pit can pass between said rims radially thereof for discharge from between the wheels in any suitable manner.

As seen in Figs. 2, 3, the rims 4, 5 each is of rubber that is preferably solid and non-moisture absorbent, but flexible and resilient and the peripheral outer walls 6 of said rims extend divergently outwardly in direction away from the axis of the wheels. These peripheral walls are flexibly supported in spaced relation to the inner walls 7, which latter walls have the same inclination as walls 6. Parallel opposed walls 8 are integral with walls 7 and are secured to the wheels.

The walls 6 virtually form a V-shaped support, except that the apex is cut away to leave a space between said walls, and said walls have ribs 9 on their outer sides that extend transversely thereacross at the same incline as said walls 6. Said walls 6 are connected with the inner walls 7 along their peripheral outer edges by being integral with said inner walls along said outer edges. Inasmuch as the walls 6, 7 are of resilient rubber or plastic material and are spaced apart except where they are connected, it will be seen that the outer walls 6 are yieldable against radially inwardly directed pressure. Hence a drupe 10 supported on the walls 6 and automatically centered thereon at the upper sides of the rim, as seen in Fig. 2 will be yieldably supported by said walls 6. The fact that the rims 5, 6 including walls 6, 7, 8 are of solid rubber is quite important for the reason that there is considerable moisture present in a pitting operation and the pitting machines may be frequently washed with water to keep them clean. If sponge or foam rubber were employed, it would quickly become waterlogged, and would swell and disintegrate under use. If springs were used they would corrode and be difficult to clean, and the expense of making spring supported supports together with the cost of upkeep would be prohibitive.

Above the wheels 3 and centered over the space 11 between the adjacent lower edges of the walls 6 (which preferably project a distance laterally and toward each other farther than the walls 8) is the cutting blade 12. This blade 12 is disposed in a vertical plane that bisects the space 11 between said wheels 3 in a direction longitudinally of rims 4, 5.

As best seen in Fig. 1 the drupes 10 are delivered onto the upper sides of the rims 4, 5 and to the generally V-shaped support provided by walls 6, the delivery (as seen in Fig. 1) being in a direction from right to left. The blade 12 is positioned so that the end of the cutting edge 13 that is nearest the oncoming drupes is spaced above the rims 4, 5 about the maximum diameter of the pit 15 of each drupe, and said edge 13 curves upwardly at said end as indicated at 16.

Where freestone peaches and apricots are being pitted each pit has its suture or greatest diameter in the plane of the suture of the body of the drupe. In the patent and application mentioned earlier in this specification, the drupes are positioned by hand for being impaled by the cutting edge of a blade that is somewhat similar to the blade 2 in the plane of the suture of each drupe when the drupe is fed onto the wheel rims. The same positioning of the drupes occurs in the present instance, except that the feeding onto the wheel rims may be performed automatically by a feeding mechanism.

Upon each drupe being fed onto the rims of wheels 4, 5 the edges 16, 13 of blade 12 will cut each drupe substantially to the upper edge of the pit. As the wheels 4, 5 are rotated counterclockwise, the drupes thereon will be rotated clockwise due to the resistance produced by the impalement of the drupes by the blade 12 and the engagement between the edge 13 and the pit. Thus the body of each drupe is quickly and efficiently bisected to the pit by the blade 12.

As the cutting edge 13 extends away from the end that meets the oncoming drupes, it progressively curves toward the space 11 until the edge is so close that the pit in each drupe will be forced by said edge through space 11 and out of the halves of the drupes.

It is pertinent to note that the edge of blade 12 at the point where it is nearest to space 11 is divided to form a generally inverted V, the said division being gradual and commencing at the end 17 of the dotted line in Fig. 1, which line represents the base or apex of the inverted V. These two edges 18 (Fig. 3) are provided instead of one. This division insures the proper discharge of the pits between the rims 4, 5. The pits, whether split or cracked or offset to one side or the other relative to blade 2 will be held between edges 18 at their final point of movement between said rims.

It is also important to note that a pair of oppositely downwardly extending strips 20 are at opposite sides of the blade 12. In Figs. 1, 2 these strips are secured to the blade. In Figs. 4, 5, they are carried on frame 1, and in the latter instance they are designated 21.

These strips 20, 21 are at a level above the rims 4, 5 that is about equal to the upper sides of the drupes 10 when the latter are being bisected and pitted. As the strips extend longitudinally of the direction of travel of the drupes the upper sides of said drupes will be held against the sides of the blade 12 during the bisecting operation and even if the pit were to be located to one side or the other of blade 1.

The blade 12 in the present instance is generally floatingly supported on the frame 1 in that it may bodily move away from the wheels 4, 5 in the plane of the blade or either end may move away from said wheels.

To so support the blade, a slot 25 is provided at one end through which a fixed pin 26 extends and at the opposite or lower end, a slot 27 is formed, through which a fixed pin 28 extends. When the blade is in its position nearest space 11, the pins 26, 28 engage the upper closed ends of said slots, said slots extending parallel and slantingly downwardly from said pins in a direction generally toward a drupe that is supported on the rims 4, 5.

A leaf spring 29 engages the upper edge of blade 2 at a point about midway between slots 25, 27 for yieldably urging the blade to a position so the pins 26, 28 are at the upper closed ends of said slots, and over the lower pin 28 a spring 30 engages the upper edge of said blade for yieldably urging the lower end of the blade toward space 11 with greater force than the upper end of the blade.

By this arrangement, a pit entering the space between the edge 13 and the rims 4, 5 may cause the blade to move away from the space 11 at the forward end of said edge 13 if the pit is too large to freely pass between the edge 13 and the rims. In this instance the blade will pivot or rock about pin 28. If the resistance between the pit and the rims and edge 13 exceeds a predetermined pressure then the blade may first rock about pin 28 and later rock about pin 26 or it may be moved bodily away from the space 11, but in any event the pit will be moved between the rims and separated from the halves of the drupe.

A screw 31 is provided for adjusting the tension of spring 30 against the blade 12 at the lower end of the latter.

Many drupes have a larger diameter in the plane of the suture of each drupe. This is particularly true of some varieties of apricots, so that the drupes appear to be flattened slightly. The feed device in the present instance is adapted to automatically feed such drupes to the pitting machine so that they are positioned with their sutures in the plane of the blade 12.

The feed device best shown in Figs. 6 to 9 comprises a relatively narrow, horizontally extending belt 40 that extends at one end over a pulley 41 that is disposed between wheels 4, 5 so that the upper reach of said belt is adapted to support a drupe 10 thereon for delivery of such drupe onto the upper sides of rims 4, 5. A bracket 42 secured to a fixed part of frame 1 is adapted to so support said pulley.

Belt 40 extends at its other end over a pulley 43 that is spaced from the pitting machine. The pulley 43 is on a shaft 44 and adjacent to said pulley are the upwardly slanting sides 45 of a feed hopper. These sides extend divergently upwardly from opposite sides of the upper reach of belt 40 so that apricots placed between said sides will be deposited on the upper reach of belt 40 for being carried to the pitting machine.

Extending upwardly at opposite sides of belt 40 are a pair of horizontally elongated belts 46, which belts with belt 40 form a moving, upwardly opening channel for carrying the drupes to the pitting machine. Said belts 46 extend past opposite sides of the wheels 3 at their ends that are remote from the feed hopper 45.

The adjacent reaches of belts 46 are yieldably urged toward each other by leaf springs 47 that yieldably engage the oppositely outwardly surface of said reaches so as to insure engagement between the belts 46 and the drupes.

The belts 46 extend around pulleys 48 at one of their ends and around pulleys 49 at their other ends, said last mentioned ends being adjacent to the feed hopper. As the adjacent reaches of the belts 46 approach the pulleys 49 they diverge slightly from each other so that drupes may freely enter the space between said reaches.

Pulleys 49 are secured on the upper ends of vertical shafts 50, and their lower ends each have a bevel gear 51 secured thereto. A horizontal shaft 52 extends below the gears 51 and has bevel gears 53 secured thereto, which gears 53 have their teeth in mesh with those of the gears 51.

Shafts 44, 52 are parallel and a sprocket wheel 54 on one end of shaft 44 connects by a chain 55 with a sprocket wheel 56 on the corresponding end of shaft 52.

A sprocket wheel 57 on shaft 52 connects by a sprocket chain 58 with a sprocket wheel 59 that is secured on shaft 2 that in turn carries wheels 3. Shaft 2 is driven by means of a motor 60 that in turn connects with a shaft 61 through a gear box 62. A sprocket wheel 63 on said shaft 61 is connected by a sprocket chain 64 with a sprocket wheel 65 on shaft 2. Thus the motor 60 may drive the pitting machine and the feed device.

The driving arrangement for belts 46 and belt 40 is such that the belt 40 has a faster surface speed than the belts 46. The result of this is that the drupes on belt 40 will automatically arrange themselves from a position seen in Fig. 8 to the position seen in Fig. 9 and will be delivered onto the rims 4, 5 in the latter position with their sutures in the plane of blade 12. In most freestone drupes the major diameter is in the plane of the suture so the feed device is effective even where the drupes are not greatly flattened, although it is obvious that the drupes will position themselves with their minor axes horizontal more rapidly when their flattened shapes are relatively pronounced.

It may be noted that different combinations can be effected in the delivery or feeding mechanism. For example, the belts 46 may be driven faster than belt 40, or belt 40 may be stationary and the apricots or fruit will assume positions with their sutures in vertical planes that are parallel with the direction of travel, but the arrangement shown is preferable.

We claim:

1. In a pitting machine for freestone drupes such as apricots and the like; a pair of elongated, parallel supports supported for movement longitudinally thereof in one direction and spaced apart for supporting a drupe thereon with its pit over said space, means for so moving said supports for carrying said drupe therewith, a vertical blade supported in a position above and over said space and in a plane bisecting said space longitudinally of said supports and having a cutting edge directed toward said space, said edge being spaced at one of its ends above said space a distance less than the diameter of said drupe and a distance sufficient for the pit of such drupe on said supports to pass between said edge and said space and said edge extending in said plane in said direction of movement of said supports away from said one end and progressively nearer to said space until said edge is sufficiently close to said space to move the pit in said drupe out of the latter and through said space as said drupe is carried on said supports in said one direction, and a pair of parallel, elongated, holddown strips supported at opposite sides of said blade and extending generally in the direction of movement of said drupe, said strips extending divergently downwardly away from said opposite sides transversely thereof and means for holding said strips in positions for extending over and substantially in engagement with the upper sides of the halves of said drupe at opposite ends of said blade as said drupe is carried on said supports in said one direction.

2. In a pitting machine for freestone drupes such as apricots and the like; a pair of elongated, parallel supports supported for movement longitudinally thereof in one direction and spaced apart for supporting a drupe thereon with its pit over said space, means for so moving said supports for carrying said drupe therewith, a vertical blade supported in a position above and over said space and in a plane bisecting said space longitudinally of said supports and having a cutting edge directed toward said space, said edge being spaced at one of its ends above said space a distance less than the diameter of said drupe and a distance sufficient for the pit of such drupe on said supports to pass between said edge and said space and said edge extending in said plane in said direction of movement of said supports away from said one end and progressively nearer to said space until said edge is sufficiently close to said space to move the pit in said drupe out of the latter and through said space as said drupe is carried on said supports in said one direction, and an elongated feed conveyor extending from a point spaced outwardly of said supports to alongside opposite outer sides of said pair of supports and into said space for conveying drupes onto said supports at a point below said one end of said cutting edge of said blade, means supporting said conveyor for movement longitudinally thereof into said space, and means connected with said conveyor for so moving it, whereby a drupe placed on said conveyor at said point outwardly of said supports will be automatically fed onto said supports.

3. In a pitting machine for freestone drupes such as apricots and the like; a pair of elongated, parallel supports supported for movement longitudinally thereof in one direction and spaced apart for supporting a drupe thereon with its pit over said space, means for so moving said supports for carrying said drupe therewith, a vertical blade supported in a position above and over said space and in a plane bisecting said space longitudinally of said supports and having a cutting edge directed toward said space, said edge being spaced at one of its ends above said space a distance less than the diameter of said drupe and a distance sufficient for the pit of such drupe on said supports to pass between said edge and said space and said edge extending in said plane in said direction of movement of said supports away from said one end and progressively nearer to said space until said edge is sufficiently close to said space to move the pit in said drupe out of the latter and through said space as said drupe is carried on said supports in said one direction, and a feed conveyor extending alongside opposite outer sides of said pair of supports and into said space for conveying drupes onto said supports at a point below said one end of said cutting edge of said blade, means for moving said conveyor toward said point below said one end, the portions of said conveyor extending between said supports being adapted to support said drupes thereon and the portions extending alongside opposite sides of said supports being at a level above said first mentioned portion and spaced apart a distance for engaging opposite lateral sides of said drupes, and said first mentioned portion being movable at a higher rate of speed than said portions that extend to opposite sides of said supports whereby said drupes will adjust themselves with their minor axes horizontal during their movement to said supports so that said drupes will be impaled by said blade in a plane perpendicular to said minor axis.

4. In a pitting machine for freestone drupes such as apricots and the like; a pair of elongated, parallel supports supported for movement longitudinally thereof in one direction and spaced apart for supporting a drupe thereon with its pit over said space, means for so moving said supports for carrying said drupe therewith, a vertical blade supported in a position above and over said space and in a plane bisecting said space longitudinally of said supports and having a cutting edge directed toward said space, said edge being spaced at one end thereof above said space a distance less than the diameter of said drupe and a distance sufficient for the pit of such drupe on said supports to pass between said edge and said space and said edge extending in said plane in said direction of movement of said supports away from said one end and progressively nearer to said space until said edge is at a point sufficiently close to said space to engage said pit and to commence moving the pit in said drupe toward said space as said drupe is carried on said supports in said one direction, the edge of said blade from said one end substantially to said point being single and the remainder being divided from said point onward and progressively merging to said single edge at said point to provide a pair of spaced edges from said point onward whereby the meat of such drupe at its pit will be progressively moved away from said pit as said drupe is moved along said pair of edges.

5. In a pitting machine for pitting freestone drupes and having a pair of coaxial, horizontally spaced annular rims of equal diameter having outer peripheral adjacent surfaces radially inclined divergently outwardly to provide a generally V-shaped support open at the apex for supporting a drupe thereon at points at opposite sides of a vertical plane bisecting the space between said rims with the pit of such drupe over said space, a cutting blade in said plane above said rims having a cutting edge directed toward said space and spaced at one end thereof above said rims a distance less than the diameter of said drupe and sufficient for said drupe to pass below said edge when the latter is supported on the rim at said point, means for rotating said rims for carrying a drupe thereon toward said blade and to and below said edge, said edge extending from said one end in said direction progressively closer to said space to a point sufficiently near to said space to move said pit through the latter and out of the flesh of said drupe upon said drupe being carried by said rims in said direction, said rims being of resilient, moisture resistant and non-moisture absorbent material and means spaced from the inner adjacent edges of said rims and integral with their divergent outer edges for resiliently supporting said rims along their divergent outer edges for movement of their inner adjacent edges generally radially under a predetermined pressure of drupes supported on said rims, said rims being spaced apart a sufficient distance so that said points of engagement between said rims and said drupes will be between said means that resiliently supports said rims.

6. In a pitting machine for drupes and the like having a cutting blade formed along one edge with a cutting edge, a carrier for drupes extending past said edge for supporting drupes thereon for movement past said blade in bisecting relation to said blade, said carrier comprising a pair of parallel, elongated, hollow waterproof supports of resilient rubber-like material positioned along opposite sides of the plane of said blade and extending past the latter adjacent the edge of said blade, said supports having divergently upwardly extending drupe supporting surfaces facing generally toward said blade for centering a drupe thereon relative to said plane, means supporting said supports for movement in one direction past said blade, and means for so moving said supports, the adjacent lower portions of said supports being open and the means supporting said supports for movement being a wheel with said supports carried on the outer periphery thereof.

7. In a pitting machine for drupes and the like having a cutting blade disposed in a vertical plane with an elongated generally horizontally extending cutting edge along an edge thereof, a carrier for carrying whole drupes past said blade for bisection thereof by the latter comprising a pair of parallel, elongated, solid, resilient strips of waterproof rubber-like material extending generally longitudinally of said cutting edge along opposite sides of the vertical plane of said blades and having upper sides extending divergently upwardly transversely of the lengths of said strips for supporting such drupes thereon centered relative to said plane, means supporting said strips along their upper longitudinally extending edges only for movement of said strips longitudinally thereof in one direction past said blade, the portions of said strips extending convergently downwardly from said means being supported in air from said means for free flexing under downward pressure against a drupe supported on said portions.

References Cited in the file of this patent

UNITED STATES PATENTS

| | | |
|---|---|---|
| 404,517 | Briggs et al. | June 4, 1889 |
| 752,929 | Shelley | Feb. 23, 1904 |
| 1,365,166 | Garman | Jan. 11, 1921 |
| 1,407,524 | Fourchy | Feb. 21, 1922 |
| 2,474,492 | Perrelli et al. | June 28, 1949 |
| 2,556,266 | Furtado | June 12, 1951 |